United States Patent [19]

Franz et al.

[11] 4,412,450
[45] Nov. 1, 1983

[54] ARRANGEMENT FOR DETERMINING THE LEVEL IN A CONTAINER

[75] Inventors: Hans-Jurgen Franz, Schopfheim; Volker Dreyer, Lorrach-Haagen, both of Fed. Rep. of Germany

[73] Assignee: Endress u. Hauser GmbH u. Co., Maulburg, Fed. Rep. of Germany

[21] Appl. No.: 285,763

[22] Filed: Jul. 22, 1981

[30] Foreign Application Priority Data

Aug. 1, 1980 [DE] Fed. Rep. of Germany ....... 3029279
Jul. 13, 1981 [DE] Fed. Rep. of Germany ....... 3127637

[51] Int. Cl.³ .............................................. G01F 23/26
[52] U.S. Cl. .................................................. 73/304 C
[58] Field of Search ....................... 73/304 C; 340/620

[56] References Cited

U.S. PATENT DOCUMENTS

| | | | |
|---|---|---|---|
| 3,042,908 | 7/1962 | Pearson | 340/620 |
| 3,543,046 | 11/1970 | Tiffany | 73/304 C X |
| 3,956,760 | 5/1976 | Edwards | 73/304 C X |
| 4,149,412 | 4/1979 | Fish | 73/304 C |

FOREIGN PATENT DOCUMENTS

2259849 6/1974 Fed. Rep. of Germany .

*Primary Examiner*—James J. Gill
*Assistant Examiner*—Joseph W. Roskos
*Attorney, Agent, or Firm*—Gerald J. Ferguson, Jr.; Joseph J. Baker

[57] ABSTRACT

An arrangement for determining the level in a container includes a capacitive probe disposed in the container, a measuring transducer arranged in the vicinity of the container, and a remote evaluation apparatus. The measuring transducer produces a signal corresponding to the capacitance between the probe and the container. This signal, which is indicative of the level in the container, is transmitted from the transducer to the evaluation apparatus via a two-wire line, which also transmits the current supply DC voltage from the evaluation apparatus to the transducer. The transducer includes a switch for periodically switching from the probe capacitance to a test capacitance. The evaluation apparatus comprises a time control circuit which periodically varies or interrupts the DC voltage on the two-wire line, and the transducer includes a control circuit which responds to the voltage changes to actuate the switch. This permits control of the test operation by the evaluation apparatus over the same two-wire line which also carries the measuring signal and the current supply voltage.

13 Claims, 4 Drawing Figures

ARRANGEMENT FOR DETERMINING THE LEVEL IN A CONTAINER

BACKGROUND AND SUMMARY OF THE INVENTION

The present invention relates to an arrangement for determining the level in a container comprising a capacitive probe which is disposed insulated in the container and the capacitance of which depends on the level, a measuring transducer which is disposed at the location of the container and produces a measured value signal dependent on the probe capacitance and an evaluation means which is disposed remote from the container and which is connected to the tranducer by a two-wire line via which on the one hand the DC energy necessary for operating the transducer is transmitted from the evaluation means to the transducer and on the other hand the measured value signal furnished by the transducer is transmitted to the evaluation means.

Arrangements of this type have the advantage that between the measuring transducer and the evaluation means only a simple two-wire line is present which serves both for the current supply of the transducer and for the transmission of the measured value signals. The signal quantity designating the level is the frequency of the oscillations produced by the oscillator; measured value signals with this frequency or preferably with a lower frequency derived therefrom by frequency division are superimposed on the supply direct current on the two-wire line. The evaluation means determines the frequency of the superimposed measured value signals and obtains therefrom information on the level. It is frequently only necessary to determine the falling below or exceeding of a predetermined maximum or minimum level; such arrangements are then referred to as limit switches.

It is known from DE-OS No. 2,701,184 for the purpose of superimposing measured value signals to connect a resistance branch controlled in time with the measured value signals to the two-wire line in shunt with the measuring transducer. The measured value signals are then additional current pulses which are superimposed on the supply direct current carried by the two-wire line. When applying this feature to an arrangement of the type set forth at the beginning the recurrence frequency of the superimposed current pulses represents the level in the container.

It is also possible to convert the frequency of the oscillator to a direct current dependent thereon and to superimpose this direct current as measured value signal on the supply direct current along the two-wire line. The evaluation means is then constructed so that it responds to the changes in the direct current.

However, it can occur in the known arrangements of this type that interferences at the probe or in the transducer are not recognised or even interpreted as incorrect level. In certain uses a complete absence of the measured value signals, due for example to failure of the transducer by a probe short-circuit or by probe breakage, may even lead to an erroneous interpretation. For with dissipative filling materials it may happen that the vibrations of the oscillator stop due to the extreme damping when the probe is completely covered by the material. From the point of view of the level measurement this phenomenon is not disadvantageous because the absence of the oscillations can be interpreted as "container full" information. However, the problem remains that it is not possible to recognise in the evaluation means whether the absence of the measured value signals is a normal operating condition or the consequence of serious trouble.

The objective of the present invention is to provide an arrangement of the type described at the beginning in which errors and trouble occurring are reliably recognised in the evaluation means and distinguished from the normal operating conditions.

According to the invention this is achieved by a switching means disposed in the transducer for switching from the capacitive probe to a test capacitance which is different to any probe capacitance occurring in normal operation and by a control means for periodic actuation of the switching means.

In the arrangement according to the invention in each actuating period of the switching means two different types of measured value signals are transmitted, that is in one partial period (with the probe connected) measured value signals expressing the level information and in the other partial period (with the probe disconnected) measured value signals which correspond to the test capacitance and indicate the correct operation of the transducer. In this manner errors and trouble can be recognised in the evaluation means.

Since the probe capacitance is disconnected completely during the test partial period, the test signal is constant and in particular independent of the level in the container. Furthermore, it differs from any level measuring signal occurring in operation and consequently there is no danger of confusion.

The arrangement according to the invention is particularly suitable for measuring transducers which contain an oscillator whose frequency depends on the probe capacitance. In this case the oscillator generates for each periodic actuation of the switching means a test frequency which is different from the measuring frequency and depends on the test capacitance. This makes it possible in the evaluation means to recognise errors and trouble which change the oscillating frequency of the oscillator and thus indicate an incorrect level. Furthermore, even with dissipative filling material it can clearly be seen whether the absence of the oscillations is due to a failure of the apparatus or corresponds to the normal operating condition in which the probe is completely covered. For in the latter case the oscillator must start oscillating again in the partial periods in which the probe is disconnected so that in these partial periods a measured value signal with the corresponding recurrence frequency or the corresponding direct current value is transmitted via the two-wire line to the evaluation means. In contrast, in the former case the measured value signal is absent completely and with the arrangement of the invention this always indicates a fault.

An advantageous further development of the invention resides in that the capacitive probe comprises a probe electrode which is insulated from the container and via which a galvanic circuit controlled by the switching means passes, and that a detector circuit is provided which responds to the periodic current pulses produced by the periodic actuation of the switching means in the galvanic circuit and on absence of the periodic current pulses effects the transfer of information designating said absence to the evaluation means.

With this further development it is in particular possible to determine whether a short-circuit or an interruption is present in the probe connection. For in both cases the detector circuit receives no current pulses with the recurrence frequency of the actuation of the switching means but a constant potential.

BRIEF DESCRIPTION OF THE DRAWINGS

The foregoing and other objects and features of the present invention will become more apparent upon a consideration of the following description taken in connection with the accompanying drawings, wherein.

DETAILED DESCRIPTION OF THE INVENTION

Figure 1:
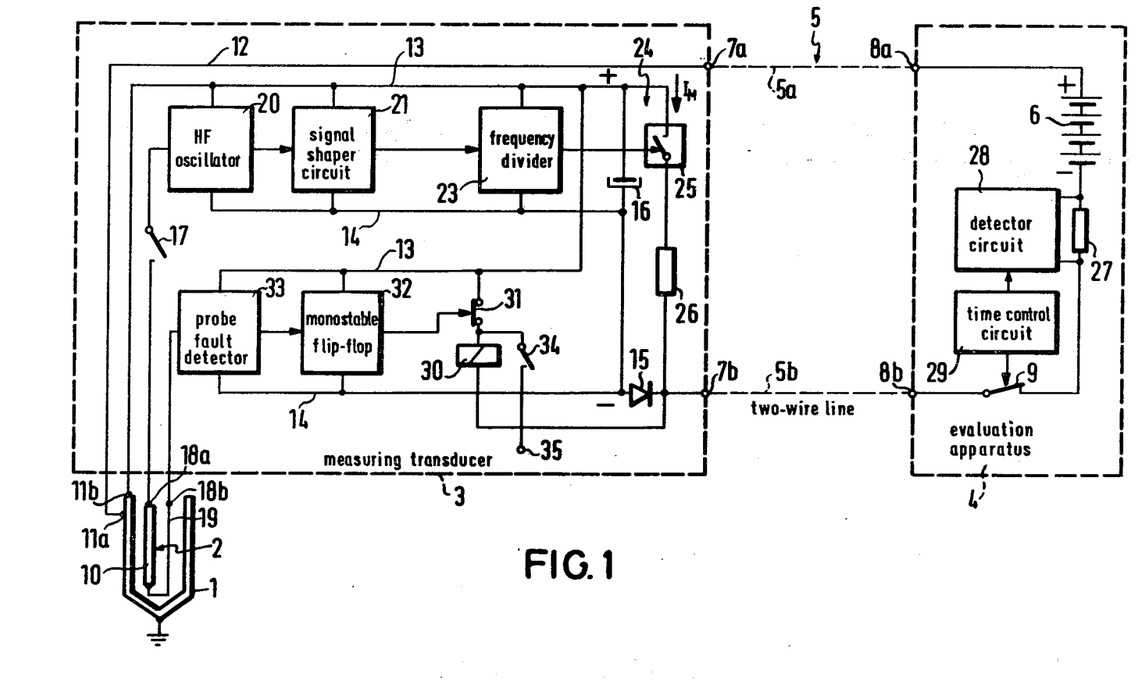
FIG. 1 is a block diagram of an arrangement according to the present invention.

The arrangement illustrated in FIG. 1 serves to determine the level in a container 1 containing a liquid or a bulk material. As example, it will be assumed that the determination is of a predetermined minimum or maximum limit level so that the arrangement operates as limit switch. Disposed in the container 1 is a capacitive probe 2 whose capacitance varies in dependence upon the level. An electronic measuring transducer 3 disposed at the location of the container detects the changes of the capacitance of the probe 2 and converts them to pulse-like measured value signals which are transmitted to an evaluation means 4 disposed at a remote location. The transducer 3 is connected to the evaluation means via a two-wire line 5; via this two-wire line, firstly the transducer 3 is supplied with current from a DC voltage source 6 disposed at the location of the evaluation means 4 and secondly the measured value signals are transmitted from the transducer 3 to the evaluation means 4. In the usual manner the measured value signals can be utilised in the evaluation means 4 to indicate when the minimum or maximum level to be detected has been reached or alternatively to initiate switching operations with which for example a filling or discharge operation is initiated or terminated.

The one conductor 5a of the two-wire line 5 connects a terminal 7a of the transducer 3 to a terminal 8a of the evaluation means 4 to which the positive pole of the DC voltage source 6 is also directly connected. The other conductor 5b of the two-wire line 5 connects a terminal 7b of the transducer 3 to a terminal 8b of the evaluation means 4, said terminal being connected via a switch 9 to the negative pole of the DC voltage source 6.

The capacitive probe 2 comprises a rod-like probe electrode 10 which represents one plate or charge of the capacitance to be measured whereas the other plate is formed by the metal wall of the container 1. The probe electrode 10 may be formed by a metal rod having a thickness of about 12 mm which is disposed vertically in the container and is insulated by an insulating sheath from the container 1 and the material contained therein.

One terminal 11a on the container 1 is connected by a conductor 12 directly to the terminal 7a. The container 1 is thus at the potential of the positive pole of the voltage source 6. Since the container 1 is generally grounded and the ground potential is expediently taken as ground potential of the electronic circuits, this is a circuit with the "positive pole grounded".

The current supply of the electronic circuits contained in the transducer 3 is between two conductors 13 and 14, of which the conductor 13 carries the positive ground potential whilst the negative potential is carried by the conductor 14. The conductor 13 is not directly connected to the terminal 7a but to a second terminal 11b of the container 1 which is spaced from the terminal 11a. This feature makes it possible to monitor whether the plate of the capacitance which is represented by the container 1 is correctly connected. For if the connection between the container 1 and the positive terminal of the voltage source 6 is interrupted at any point the current supply of the transducer 3 is also interrupted and said transducer does not furnish any signals. The complete absence of signals is detected in the evaluation means 4 as an indication of the presence of a fault.

The conductor 14 is connected to the terminal 7b via a diode 15 so that the supply direct current can flow back to the negative terminal of the DC voltage source 6 when the switch 9 is closed.

Between the conductors 13 and 14 a capacitor 16 is connected which in operation is charged substantially to the voltage of the DC voltage source 6 and acts as energy store.

The transducer 3 includes an HF oscillator 20 which is connected via a switch 17 to one terminal 18 at one end of the rod-like probe electrode 10. The oscillator 20 is so constructed that it oscillates at a predetermined frequency (for example about 400 kHz) when the switch 17 is open. On closure of the switch 17 the probe capacitance present between the terminals 11b and 18a is connected to the oscillator circuit capacitance of the HF oscillator 20 so that the oscillating frequency of the oscillator 20 is reduced to a greater or lesser degree in dependence upon the value of the probe capacitance. The value of the probe capacitance depends on the level and on the dielectric constant of the filling material; it is smallest when the level is lower than the lower end of the probe electrode 10 so that the probe is completely surrounded by air as dielectric. The probe capacitance increases with increasing covering of the probe by the material and reaches its maximum value when the probe is completely covered by the material. At this maximum value of the probe capacitance the oscillating frequency of the oscillator 20 has its smallest value. With the previously assumed numerical value of the maximum oscillating frequency $f_{max}=400$ kHz (with the switch 17 open) the minimum oscillating frequency (with switch 17 closed and the probe completely covered) can for example be $f_{min}=138$ kHz. The oscillating frequency lies between these two values when the probe is not covered or only partially covered by the material and the switch 17 is closed.

If the filling material is dissipative and the probe 2 is completely or partially covered the oscillator wave is damped and as a result from a certain degree of covering onwards the oscillator oscillation is eliminated. This state can also be used to detect a predetermined level.

Connected to the output of the oscillator 20 is a signal shaper circuit 21 which converts the oscillations furnished by the oscillator 20 to rectangular signals of the same frequency. The rectangular signals produced by the signal shaper circuit 21 are supplied to the input of a frequency divider 23 which furnishes rectangular signals of relatively low frequency. If the frequency divider 23 has a division ratio of 2048, with the previously indicated numerical values for the oscillating frequency f of the oscillator 20 the frequency f of the output signals of the frequency divider 23 is between the following values:

For $f_{max}=400$ kHz: $F_{max}=195$ Hz,
for $f_{min}=138$ kHz: $F_{min}=67$ Hz.

The output signals of the frequency divider 23 control a resistance branch 24 which is connected between the conductor 13 and the terminal 7b and in the example illustrated is formed by a switch 25 in series with a fixed resistance 26. The switch 25, which is in reality an electronic switch, is alternately opened and closed by the rectangular signals furnished by the output of the frequency divider 23 in time with said signals. When the switch 25 is closed the fixed resistance 26 lies in parallel with the loads of the transducer 3 at the terminals 7a, 7b of the two-wire line 5 so that a current $I_M$ flows via the controlled resistance path 24. The diode 15 prevents said additional current $I_M$ from being taken from the capacitor 16. The current $I_M$ must therefore be furnished by the DC voltage source 6 via the two-wire line 5 so that it is superimposed in the two-wire line on the normal supply direct current which flows on its own when the switch 25 is open. Since the switch 25 is actuated in time with the output signals of the frequency divider 23, current pulses $I_M$ whose recurrence frequency is proportional to the oscillation frequency of the oscillator 20 are superimposed on the supply direct current along the two-wire line 5.

The evaluation apparatus 4 contains means for detecting the superimposed current pulses $I_M$. For this purpose, for example, a low-valued resistor 27 can be inserted into the connection between the terminal 8b and the negative terminal of the DC voltage source 6. A detector circuit 28 connected to the terminals of the resistor 27 detects the additional voltage drop caused by each current pulse $I_M$ at the resistor 27.

Since each pulse $I_M$ produces an additional voltage drop not only at the resistor 27 but also along the two-wire line 5, the voltage at the terminals 7a, 7b fluctuates in time with the pulses $I_M$. The diode 15 forms together with the capacitor 16 a separating circuit which keeps the voltage fluctuations away from the transducer 3.

The switch 17 is periodically actuated so that the probe capacitance is alternately separated from the oscillator circuit of the oscillator 20 and connected to said circuit. In the example of embodiment illustrated the periodic actuation of the switch 17 is controlled by the evaluation means 4 with the aid of the switch 9. A time control circuit 29 present in the evaluation means 4 opens the switch 9 periodically for brief intervals so that the supply direct current along the two-wire line 5 is interrupted for said intervals. For simplicity it is assumed that the switch 17 is a working contact of a relay 30 whose winding is connected on the one hand directly to the terminal 7b (before the diode 15) and on the other hand via a normally closed switch 31 to the conductor 13. The switch 31 is opened by the output signal of a monostable flip-flop 32 when the latter is in the operating condition. The triggering of the monostable flip-flop 32 is by the output signal of a probe fault detector 33 whose input is connected to a second terminal 18b of the probe 2. The terminal 18b is connected for example via a wire 19 running within the probe insulation to the other end of the rod-like probe electrode 10. Thus, when the switch 17 is closed there is a direct current path from the conductor 13 via the oscillator 20, the switch 17, the rod-like probe electrode 10 and the detector 33 to the conductor 14. If the switches 9 and 31 are closed the relay 30 is energised so that the switch 17 is also closed. On opening the switch 9 the relay 30 drops out so that the switch 17 opens. This interrupts the direct current path via the probe electrode 10 to the detector 33. This interruption causes the detector 33 to trigger the monostable flip-flop 32. The monostable flip-flop 32 opens the switch 31 for the duration of its hold time. The relay 30 thus remains dropped out when the switch 9 is again closed. Only when the switch 31 closes again at the end of the hold time of the monostable flip-flop 32 does the relay 30 becomes energised again so that the switch 17 is closed. This operation is repeated on each brief opening of the switch 9, assuming of course that the hold time of the monostable flip-flop is shorter than the interval between two successive actuations of the switch 9.

As example, it is assumed that the time control circuit 29 opens the switch 9 at intervals of 1 s in each case for a time of about 10 ms and that the monostable flip-flop has a hold time of about 0.4 s. In this case, the switch 17 is so actuated that during each period of 1 s it is closed for about 0.4 s and opened for about 0.6 s. Thus, during each period of 1 s the oscillator 20 generates for 0.4 s the measurement frequency depending on the probe capacitance and for 0.6 s the higher intrinsic frequency (400 kHz in the numerical example given above) which serves as test frequency. The evaluation means 4 examines whether the periodic alternation between test frequency and measuring frequency takes place correctly. This step makes it possible in the evaluation apparatus to monitor the correct working of the transducer and to detect various errors. In particular, with dissipative filling material it is possible to monitor whether absence of the oscillator wave is due to covering of the probe or failure of the circuit. For in the former case the oscillator wave must reappear periodically for 0.6 s; a permanent absence of the oscillator wave indicates failure of a circuit component.

The brief periodic interruption of the supply DC voltage across the two-wire line 5 has no disadvantageous effects on the power supply of the electronic circuits of the transducer 3 because the capacitor 16 acting as energy store takes over the power supply during the interruptions.

If at any point there is a permanent interruption in the direct current path running via the probe electrode 10, for example a tearing off of the probe, the probe fault detector 33 no longer periodically triggers the monostable flip-flop so that the alternation outlined above between measuring frequency and test frequency no longer takes place. The presence of a fault is thereby indicated in the evaluation means 4.

In the case of a leak in the probe insulation or condensation in the probe head a leakage current flows from the wall of the container 1 via the probe electrode 10 to the conductor 14 when the switch 17 is open. The probe fault detector 31 is so constructed that it no longer triggers the monostable flip-flop when said leakage current exceeds a predetermined maximum value. The same effect occurs of course when there is a short-circuit between the probe electrode 10 and the container wall. In all these cases of trouble the periodic alternation between measuring frequency and test frequency is modified, the fault thereby being indicated in the evaluation means 4.

In FIG. 1 a further switch 34 is illustrated which in the closed state connects a terminal 35 to the conductor 13. The switch 34 is actuated substantially synchronously with the switch 17, which is indicated in FIG. 1 by said switch likewise being formed by a working contact of the relay 30. The purpose of the switch 34 will be explained hereinafter in conjunction with FIG. 2.

Figure 2:
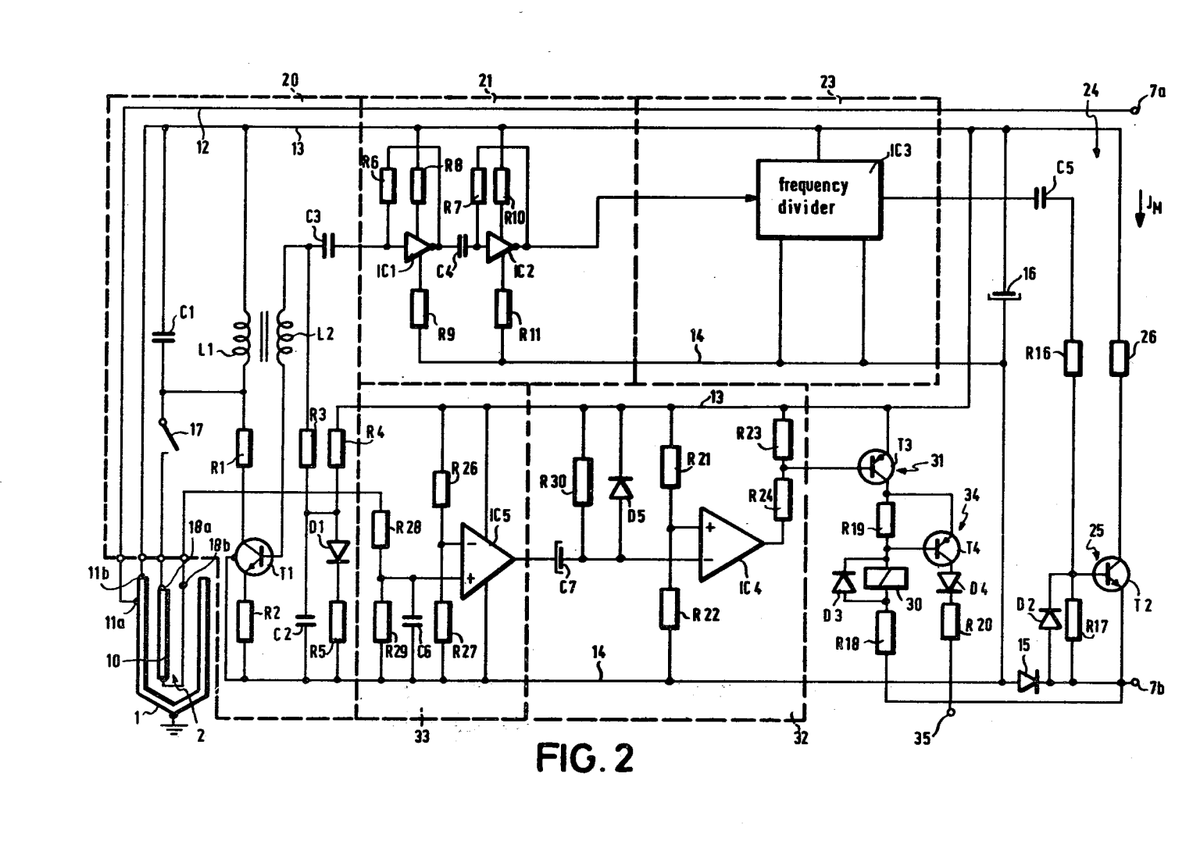
FIG. 2 is the circuit diagram of the measuring transducer of the arrangement of FIG. 1.

FIG. 2 shows the circuit diagram of an example of embodiment of the transducer 3. For clarity, the container with the probe 2 is also shown. The two-wire line 5 (not illustrated) is connected to the terminals 7a, 7b and leads to the evaluation means 4 in a manner corresponding to the illustration of FIG. 1.

FIG. 2 again shows the conductors 12, 13, 14, connected in the manner illustrated in FIG. 1, and the diode 15 as well as the capacitor 16 connected between the conductors 13 and 14. The switch 17 is again a working contact of the relay 30. This is for example a reed relay so that the switch 17 is a reed contact. This construction is readily possible with regard to the relatively large switching period of 1 s. The switch 17 may however also be constructed as electronic switch, for example in the form of a transistor or a CMOS analog switch.

The HF oscillator 20 is constructed as Meissner oscillator with inductive feedback. It contains an npn transistor $T_1$ whose collector is connected via a resistor $R_1$ and an inductance $L_1$ to the conductor 13 carrying the positive potential whilst the emitter is connected via a resistor $R_2$ to the conductor 14 carrying the negative potential. The inductance $L_1$ forms together with a capacitor $C_1$ connected in parallel therewith the frequency-determining oscillating circuit. For an inductance $L_1 = 720$ μH and a capacitance $C_1 = 220$ pF the aforementioned oscillating frequency of the oscillator of 400 kHz results. The feedback is via an inductance $L_2$ which lies in the base circuit of the transistor $T_1$ and is inductively coupled to the inductance $L_1$. The inductance $L_2$ is connected via a resistor $R_3$ to the tap of a voltage divider which furnishes the base bias and which is connected between the conductors 13 and 14 and consists of the series circuit of a resistor $R_4$, a diode $D_1$ and a resistor $R_5$. A capacitor $C_2$ connected between the tap of the voltage divider and the conductor 14 serves for HF decoupling. The oscillation produced is taken from the connection point between the inductance $L_2$ and the resistor $R_3$ and passed via a capacitor $C_3$ to the input of the pulse shaper circuit 21.

The resistor $R_1$ lying in the collector circuit of the transistor $T_1$ guarantees that even with the transistor $T_1$ conductive only the oscillator circuit components $L_1$, $C_1$ determine the frequency of the oscillator.

One terminal of the oscillator circuit capacitor $C_1$ is connected to the conductor 13 to which the container 1 is also connected. The switch 17 is connected to the other terminal of the oscillator circuit capacitor $C_1$ so that when the switch 17 is closed the probe capacitance existing between the container 1 and the probe electrode 10 lies in parallel with the oscillator circuit capacitor $C_1$. For a maximum probe capacitance of 1.6 nF the minimum oscillating frequency $f_{min}$ is 138 kHz.

The signal shaper circuit 21 comprises two cascade-connected amplifier stages whose total gain is so large that a limiting effect occurs so that at the output of the second amplifier stage a rectangular signal is obtained. The basic circuit for each amplifier stage is an integrated inverter $IC_1$, $IC_2$ having a feedback resistor $R_6$ and $R_7$ respectively. The n and p-channel MOS transistors of each amplifier stage, driven by the HF signal, are both conductive for a predetermined transition time; to limit the switching currents of the MOS transistors then flowing and the resulting increased current demand of the amplifier, resistors $R_8$, $R_9$, $R_{10}$, $R_{11}$ are inserted into the connections between the terminals of each inverter and the conductors 13 and 14 respectively. The output of the first amplifier stage is coupled to the input of the second amplifier stage via a capacitor $C_4$. The output signal of the second amplifier stage is applied to the signal input of the frequency divider 23 which is formed for example by an integrated twelve-bit binary counter $IC_3$ of the type 4040. The frequency of the rectangular signal furnished by the gate circuit 22 is therefore divided by 2048 and at the output of the frequency divider 23 a rectangular signal is obtained having a frequency between 195 Hz and 67 Hz.

The switch 25 of the controlled resistance branch 24 is formed by a transistor $T_2$ whose collector is connected via the fixed resistance 26 to the conductor 13 whilst the emitter is connected directly to the terminal 7b.

The output of the frequency divider 23 is connected via a capacitor $C_5$ in series with a resistor $R_{16}$ to the base of the transistor $T_2$ which is connected on the other hand to the terminal 7b via a parallel circuit comprising a resistor $R_{17}$ and a diode $D_2$.

The capacitor $C_5$ forms together with the resistors $R_{16}$ and $R_{17}$ a differentiating member which effects that on each rising edge of the rectangular signal furnished by the output of the frequency divider 23 the transistor $T_2$ is rendered conductive for a brief time of about 200 μs. During this switching phase of the transistor $T_2$ a current pulse $I_M$ flows via the controlled resistance path 24, the magnitude of said pulse depending on the fixed resistance 26. Said current pulse is superimposed on the basic current along the two-wire line 5.

The switch 31 is formed by a pnp transistor $T_3$ whose emitter is connected to the positive conductor 13 and whose collector is connected via the winding of the relay 30 to the terminal 7b, a low-value resistor $R_{18}$ possibly being connected in series to limit the current. A diode $D_3$ bridges the relay winding to short-circuit switching peaks. The switch 34 is also formed by a pnp transistor $T_4$ whose emitter-base path is connected in parallel with a resistor $R_{19}$ in series with the winding of the relay 30 in the collector circuit of the transistor $T_3$. The collector of the transistor $T_4$ is connected via a diode $D_4$ and a resistor $R_{20}$ to the terminal 35.

The monostable flip-flop 32 includes an integrated operational amplifier $IC_4$, for example of the type 1458, the non-inverting input of which is connected to the tap of a voltage divider which is connected between the conductors 13 and 14 and formed by two resistors $R_{21}$, $R_{22}$. Between the output of the operational amplifier $IC_4$ and the positive conductor 13 a voltage divider $R_{23}$, $R_{24}$ is connected whose tap is connected to the base of the pnp transistor $T_3$.

The probe fault detector 33 includes an integrated operational amplifier $IC_5$ connected as comparator. The inverting input of this operational amplifier is connected to the tap of a voltage divider which is formed by two resistors $R_{26}$, $R_{27}$ connected between the positive conductor 13 and the negative conductor 14. The non-inverting input of the operational amplifier $IC_5$ is connected via a resistor $R_{28}$ to the terminal 18b of the probe 2 and via a resistor $R_{29}$ to the negative conductor 14. A capacitor $C_6$ is connected in parallel with the resistor $R_{29}$.

When the switch 17 is closed there is a direct current path from the conductor 13 via the inductance $L_1$, the switch 17, the terminal 18a, the probe electrode 10, the terminal 18b, the resistor $R_{28}$ and the resistor $R_{29}$ to the conductor 14. A direct current flows via this direct current path and a predetermined HF current is superimposed thereon. Since the inductance $L_1$ and the probe electrode 10 can be regarded as short-circuit for the direct current, the resistors $R_{28}$ and $R_{29}$ form for the direct current a voltage divider to the tap of which the non-inverting input of the operational amplifier $IC_5$ is connected whilst the HF voltage at said tap is filtered out by the capacitor $C_6$. The resistors $R_{28}$ and $R_{29}$ are of the same magnitude so that at the non-inverting input of the operational amplifier $IC_5$ with the switch 17 closed a voltage is present which is equal to half the supply voltage between the conductors 13 and 14. If however the switch 17 is open the potential of the negative conductor 14 is applied to the non-inverting input of the operational amplifier $IC_5$.

The resistor $R_{26}$ is however greater than the resistor $R_{27}$; these resistances are so dimensioned that the potential at the inverting input of the operational amplifier $IC_5$ is substantially midway between the two potentials which occur periodically at the non-inverting input on opening and closing of the switch 17. The operational amplifier $IC_5$ has no feedback so that it operates as threshold value comparator whose output carrier either the positive or the negative supply potential depending on whether the potential at the non-inverting input is above or below the potential at the inverting input.

A capacitor $C_7$ is connected in series with a resistor $R_{30}$ between the output of the operational amplifier $IC_5$ and the positive conductor 13. A diode $D_5$ is in parallel with the resistor $R_{30}$. The inverting input of the operational amplifier $IC_4$ is connected to the connection point between the capacitor $C_7$ and the resistor $R_{30}$.

This circuit operates in the following manner:

When the switch 9 in the evaluation means 4 is closed and thus the full operating voltage applied to the terminals 7a, 7b the transistor $T_3$ is conductive (switch 31 closed) so that the relay 30 is energised. The switch 17 is closed and consequently the oscillator 20 oscillates at the measurement frequency depending on the probe capacitance. The direct current path extending via the switch 17 and the probe electrode 10 is closed so that at the non-inverting input of the operational amplifier $IC_5$ there is a potential which is higher than the potential at the inverting input. The output of the operational amplifier $IC_5$ carries the positive potential of the conductor 13. The capacitor $C_7$ is discharged and at the inverting input of the operational amplifier $IC_4$ there is the positive potential of the conductor 13 which is higher than the potential at the non-inverting input, which is determined by the voltage divider $R_{21}$, $R_{22}$. The output of the operational amplifier $IC_4$ consequently carries a low potential which via the voltage divider $R_{23}$, $R_{24}$ renders the transistor $T_3$ conductive.

When the connection between the terminal 7b and the negative pole of the DC voltage source 6 is interrupted by opening the switch 9 for the brief period of about 10 ms the capacitor 16 acting as energy store maintains the voltage between the conductors 13 and 14, the current supply of the electronic circuits of the transducer 3, including the operational amplifiers $IC_4$ and $IC_5$, thereby being ensured for the duration of this interruption. The diode 15 however stops the voltage of the capacitor 16 being applied to the terminal 7b. The winding of the relay 30 thus carries no current and the relay drops out and opens the switch 17. The oscillator 20 now oscillates with the test frequency. Simultaneously, the direct current path to the probe fault detector 33 is interrupted so that the non-inverting input of the operational amplifier $IC_5$ assumes the negative potential of the conductor 14. Accordingly, the output of the operational amplifier $IC_5$ also assumes the negative potential. Since the capacitor $C_7$ is initially discharged the inverting input of the operational amplifier $IC_4$ now carries a potential which is lower than the potential at the non-inverting input. Accordingly, the positive potential obtains at the output of the operational amplifier and the transistor $T_3$ is rendered non-conductive (switch 31 open).

Thus, when the switch 9 is closed again after the brief time of 10 ms the relay 30 remains without current because the transistor 31 is non-conductive. There is no change in the condition of the circuit apart from the fact that the current supply is again via the two-wire line 5 and the used charge of the capacitor 16 is again replenished. The oscillator 20 oscillates further at the test frequency and the pulses obtained therefrom by frequency division are superimposed on the supply current.

The capacitor $C_7$ is charged via the resistor $R_{30}$. As soon as the potential at the inverting input of the operational amplifier $IC_4$ exceeds the potential at the tap of the voltage divider $R_{21}$, $R_{22}$ the output of said operational amplifier reassumes the negative potential so that the transistor $T_3$ again becomes conductive. The relay 30 is energised and the switch 17 closes. The time constant of the timing member formed by the resistor $R_{30}$ and the capacitor $C_7$ is so dimensioned that this switching over takes place after 0.6 s. The non-inverting input of the operational amplifier $IC_5$ again receives the higher potential defined by the voltage divider $R_{28}$, $R_{29}$ and the output of said operational amplifier $IC_5$ assumes the positive potential. The capacitor $C_7$ discharges via the diode $D_5$. The initial condition is now again present.

In normal operation the same processes occur on each opening of the switch 9.

When the direct current path leading via the probe electrode 10 is permanently interrupted at any point, for example due to detachment of a probe, the non-inverting input of the operational amplifier $IC_5$ remains permanently at the potential of the conductor 14 and consequently the output of the operational amplifier permanently retains the low potential.

However, with a short-circuit between the probe electrode 10 and the container wall the higher potential determined by the voltage divider $R_{28}$, $R_{29}$ is permanently at the non-inverting input of the operational amplifier $IC_5$ so that the output of the operational amplifier $IC_5$ remains permanently at the positive potential. Finally, if there is a leakage current between the probe electrode 10 and the wall of the container 1, for example due to a leak in the probe insulation or due to condensation, the potential at the tap of the voltage divider $R_{28}$, $R_{29}$ when the switch is open does not drop completely to the negative potential of the conductor 14 but only to an intermediate value which corresponds to the voltage drop caused by the leakage current across the resistor $R_{29}$. If this lower voltage value is not below the potential at the tap of the voltage divider $R_{26}$, $R_{27}$ the output signal of the operational amplifier $IC_5$ also remains permanently at the high potential. By correspondingly large dimensioning of the voltage divider resistors $R_{28}$, $R_{29}$ it is possible to achieve that this effect occurs even at a relatively low leakage current value of for example about 18 μA.

In all the cases of trouble outlined the previously described periodic alternation between measurement frequency and test frequency no longer takes place. If the output of the operational amplifier $IC_5$ permanently carries the high potential the output of the operational amplifier $IC_4$ remains permanently at the negative potential; if the output of the operational amplifier $IC_5$ permanently carries the negative potential the output of the operational amplifier $IC_4$ assumes after the charging of the capacitor $C_7$ the low potential which it then retains. In both cases the transistor $T_3$ remains permanently open so that the relay 30 again receives current on closure of the switch 9 after the short period of 10 ms. The switch 17 is thus opened at the most for the short time of 10 ms so that the duty cycle of the frequency-shift operation is greatly changed. However, it would be possible to design the circuit so that the switch 17 remains closed for the brief period of 10 ms. Thus, in the evaluation means in the predetermined partial period of 0.6 s the test frequency is either not detected at all or detected for only a very short time.

In normal operation of the probe and transducer the evaluation means thus receives the current pulses $I_M$ of about 200 μs duration superimposed on the basic current, which have periodically alternately for 0.6 s in each case a recurrence frequency of 195 Hz and for 0.4 s a lower recurrence frequency corresponding to the level which (with dissipative material) can also be zero. On starting operation of the apparatus an adjustment to the limit state to be detected is made in that the recurrence frequency of the transmitted current pulses $I_M$ is stored in the evaluation means 4 with the switch 17 open and with it closed. In operation the recurrence frequency of the transmitted pulses $I_M$ is compared with the stored values. If within the partial period of 0.4 s a pulse recurrence frequency is detected which corresponds to the stored value then this is an indication that the limit state to be detected has been reached; in the evaluation means a relay can then be actuated which via its contacts signalises to the surroundings that the filling limit state has been reached or initiates corresponding switching operations.

If within the other partial period of 0.6 s the recurrence frequency of the transmitted pulses $I_M$ differs from the corresponding stored value by more than a predetermined tolerance range, this is an indication that the oscillator 20 in the transducer 3 is not operating satisfactorily, for example due to a defect in a component. In this case an alarm relay is actuated in the evaluation means 4 and indicates trouble. This alarm relay is also actuated when the test frequency does not occur within a certain interval in each partial period of 0.6 s or when the test frequency appears in the partial period intended for the transition of the measuring frequency.

In the arrangement described above it was assumed that the probe electrode 10 is provided with two terminals 18a, 18b so that via the probe electrode a galvanic circuit runs whose permanent interruption indicates probe detachment. The arrangement may however also be used in conjunction with rod probes which have only one terminal. Admittedly, it is then not possible to determine the tearing off of a probe in the manner outlined but the other functions of the circuit remain unchanged.

If the probe electrode is a completely insulated one which cannot come into conductive contact with the filling material it suffices to connect the probe electrode to the terminal 18a and short-circuit the terminals 18a and 18b. The voltage divider $R_{28}$, $R_{29}$ then receives the same pulses as previously via the switch 17 so that the alternation between test frequency and measuring frequency takes place in the manner outlined. In this case the detector 33 even responds to the occurrence of a leak in the probe insulation or a probe short-circuit.

When using a partially insulated probe electrode this step is not possible because the contacting of the probe electrode with the filling material would simulate a leak (or a short-circuit). The periodic alternation between test frequency and measuring frequency may however also be obtained in this case by connecting the terminal 18b to the terminal 35. The voltage divider $R_{28}$, $R_{29}$ is then connected via the resistor $R_{20}$, the diode $D_4$, the switch 34 formed by the transistor $T_4$ and the switch 31 formed by the transistor $T_3$ to the positive conductor 13. The transistor $T_4$ is opened by the voltage drop at the resistor $R_{19}$ whenever the relay 30 is energised; the switch 34 is thus actuated synchronously with the switch 17. The detector 33 thus also receives in this case the same pulses as before so that the periodic alternation between test frequency and measuring frequency takes place in the manner outlined.

The test and detector arrangement described is independent of the nature of the production of the measured value signals which are transmitted via the two-wire line. In particular, it is not restricted to the embodiment described as example where the oscillator frequency depends on the probe capacitance.

Figure 3:
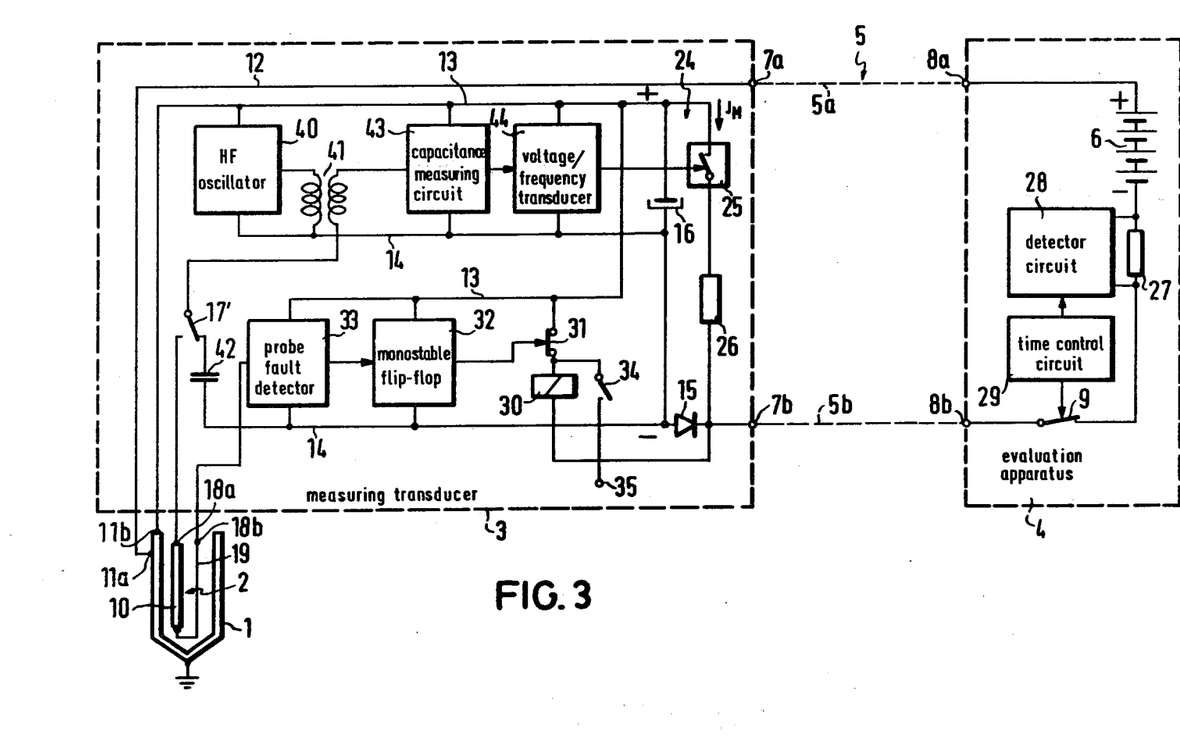
FIG. 3 is the block diagram of another embodiment of the arrangement according to the invention and FIG. 4 is the block diagram of an embodiment of the evaluation apparatus.

FIG. 3 illustrates another embodiment of a level measuring arrangement which differs as regards the nature of the production of the measured value signals from the arrangement illustrated in FIGS. 1 and 2. The same components as in FIG. 1 are provided with the same reference numerals.

In the arrangement of FIG. 3 the HF oscillator 40 continuously generates a fixed frequency which is independent of the capacitance of the probe 2. Connected to the output of the oscillator 40 is the primary winding of a transformer 41 whose secondary winding is connected via the switch 17' to the probe electrode 10. The switch 17' corresponds to the switch 17 of FIGS. 1 and 2; it is however constructed as a transfer contact which in the rest state (with the relay 30 dropped out) connects the secondary winding of the transformer 41 to a fixed test capacitance 42. Connected to the secondary winding of the transformer 41 is a capacitance measuring circuit 43 which furnishes an output voltage which is a function of the capacitance connected to the secondary winding. A voltage/frequency transducer 44 receives the output voltage of the capacitance measuring circuit 43 and produces output pulses whose recurrence frequency depends on said voltage. The switch 25 is actuated by said pulses.

The switch 17' is actuated by the relay 30, the probe fault detector 33 and the monostable flip-flop 32 on each brief opening of the switch 9 in the previously described manner. Thus, in normal operation during each period of 1 s pulses are transmitted via the two-wire line 5 which for the duration of 0.6 s have a test frequency depending on the test capacitance 42 and for the duration of 0.4 s have the measuring frequency depending on the probe capacitance. On failure of a circuit component, detachment of the probe, probe short-circuiting or a leak in the probe insulation, this regular alternation between test frequency and measuring frequency is disturbed and this is recognized in the evaluation means 4 to be the presence of a fault.

In this embodiment as well the test capacitance 42 is so dimensioned that it differs from any probe capacitance occurring in operation. Furthermore, the probe capacitance is completely disconnected during the test partial periods so that the test frequency is constant and independent of the level.

Of course, various modifications of the circuit described are possible. Thus, in the example of embodiment described it is not absolutely essential for the current supply voltage on the two-wire line 5 to be completely interrupted to energise a relay. The actuation of the switch 17 or 17' could also be by a trigger circuit which for example is initiated by a brief pulse-like lowering of the voltage to a lower value differing however from zero, or the initiation could be by superimposing signals of another type, for example audio frequency signals.

The periodic alternation described above between measured value signals and test signals which are independent of the probe capacitance additionally permits automatic compensation of ambient influences which can influence the measurement result, in particular of the temperature.

If for example in the previously described examples of embodiment the frequency of the HF oscillator 20 (in FIGS. 1 and 2) or the HF oscillator 40 (in FIG. 3) changes due to temperature influences the frequency of the measured value signals transmitted via the two-wire line 5 also changes. If no special precautions are taken this temperature-dependent frequency change will be interpreted by the evaluation apparatus as a change in the probe capacitance and the measurement result will consequently be falsified. A similar falsification of the measurement results occurs when the oscillator frequency is changed by other influences, for example by aging of the components, or when the change of the parameter of the measured value signals representing the probe capacitance is not caused by the HF oscillator but by one or more other components of the transducer.

All these disadvantageous effects can be eliminated in the arrangement described because of the fact that in each measuring period apart from the measured value signal a test signal is also present which is independent of the probe capacitance, the influences previously mentioned, such as temperature changes, affecting in equal manner the measured signals and the test signals.

The detector arrangement 28 (FIGS. 1 and 3) is so constructed that in each measuring period it stores the value of the test signal corresponding to the capacitance, i.e. in the examples of embodiment previously described the recurrence frequency of the current pulses transmitted via the two-wire line 5, and uses them for correction in the evaluation of the subsequently transmitted measured value signal. This correction can for example be made by one of the following provisions:

1. In the simplest case the stored value of the test signal is used as reference quantity in the evaluation of the measured value signal.

2. The stored value of the test signal is compared with the initial value determined on starting operation of the circuit and the deviation is used as correction quantity.

Figure 4:
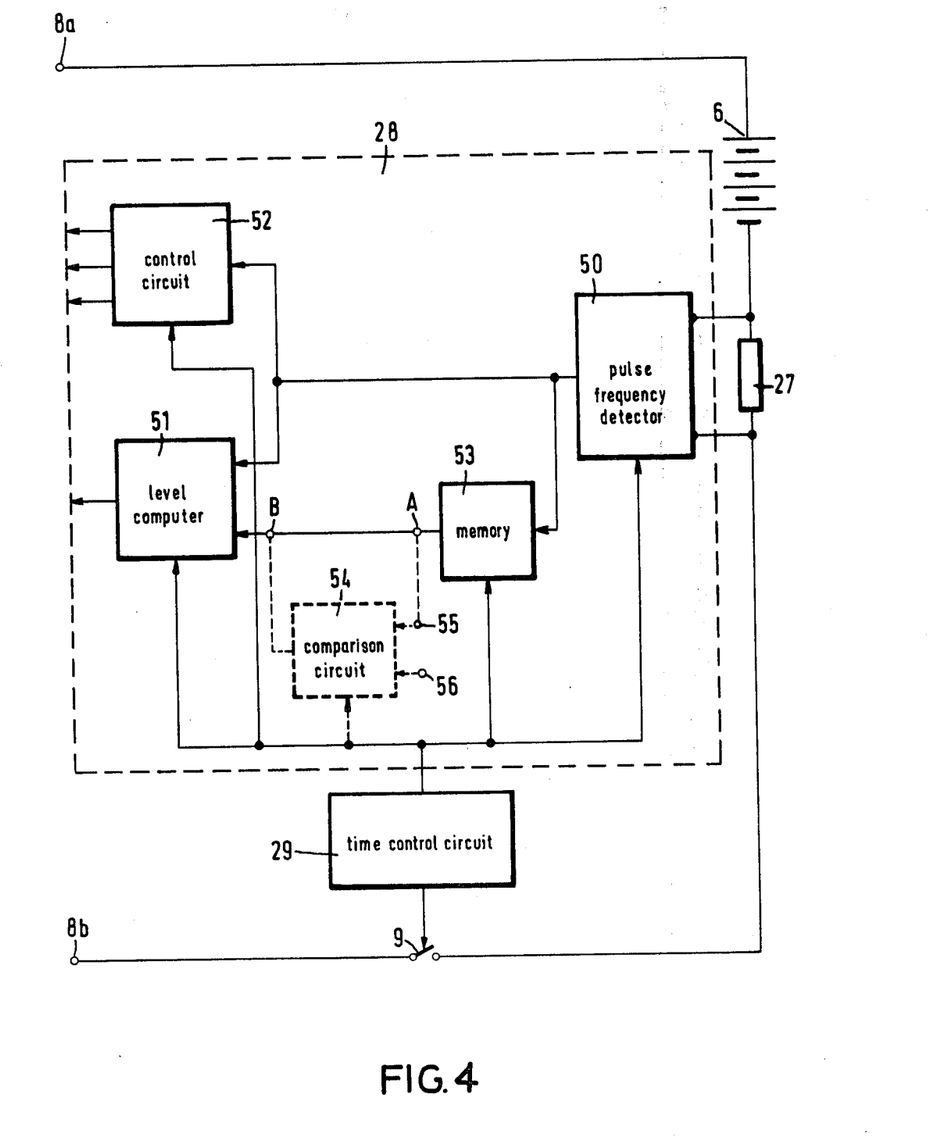

FIG. 4 shows an example a simplified block circuit diagram of the evaluation apparatus 4 which carries out the first of the aforementioned provisions in the examples of embodiment described of FIGS. 1, 2 and 3.

Apparent again in FIG. 4 are the voltage source 6, the resistor 27, the switch 9 and the time-control circuit 29.

The detector circuit 28 includes a pulse frequency detector 50 which furnishes at the output a (preferably digital) signal which represents the recurrence frequency of the current pulses passing via the resistor 27. In the previously mentioned numerical example the output signal of the pulse frequency detector 50 during each measuring period of 1 s for the duration of the measuring time interval of 0.4 s represents the measuring frequency and for the duration of the test time interval of 0.6 s represents the test frequency if no disturbance is present.

Connected to the output of the pulse frequency detector 50 in parallel are the inputs of a level computer 51 and a control circuit 52. The level computer 51 determines the probe capacitance from the measuring frequency during the measuring time interval and from said capacitance the level; in the case of a continuous level measurement it furnishes at the output a signal which indicates the level whilst when used as level limit switch it furnishes at the output a signal when the level detected is above or below a predetermined value. The control circuit 52 checks whether the measuring and test frequencies succeed each other with the correct timing and furnishes at one or more outputs signals which indicate the presence of trouble and possibly the cause thereof. The synchronisation of the circuits 50, 51 and 52 is by the time-control circuit 29 which by the actuation of the switch 9 defines the start of each measuring period.

For the purpose of the previously explained error correction a memory 53 is provided which is also connected to the output of the pulse frequency detector 50 and controlled by the time-control circuit 29. The memory 53 stores in each measuring period the test frequency determined during the test time intervals and furnishes at the output the stored value during the subsequent measuring time interval. This stored value is applied to a second input of the level computer 51.

In the level computer 51 the value of the test frequency furnished by the memory 53 is used as reference quantity in the evaluation of the measuring frequency. The value of the test frequency is to the value of the constant test capacitance ($C_1$ in FIG. 2; 42 in FIG. 3) in the same ratio as the value of the measuring frequency to the value of the probe capacitance to be measured. Temperature changes or other influences which affect in similar manner the test frequency and the measuring frequency thus remain without effect on the measurement result if the probe capacitance to be measured is determined on the basis of the ratio of test frequency to measuring frequency.

It is indicated in FIG. 4 how the circuit can be modified so that it works in accordance with the second provision indicated above. The connection between the output of the memory 53 and the second input of the level computer 52 is separated between the points A and B. Connected to the point A is an input 55 of a comparator circuit 54 which receives at its second input 56 a signal which represents the initial value of the test frequency determined on starting operation of the circuit. The comparator circuit 54 furnishes at the output connected to the point B a signal which represents the deviation of the stored test frequency from the initial value. This signal is supplied to the level computer 51 as correction signal where it is used in the evaluation of the measured value signal to correct the deviations due to temperature changes or other influences.

Of course, it would also be possible to connect the first input 55 of the comparator circuit 54 directly to the output of the pulse frequency detector 50 and the memory 53 to the output of the comparator circuit 54. In this case the comparator circuit 54 would carry out the comparison between the test frequency and the initial value in each test time interval and the memory 53 would not store the value of the test frequency but the deviation found.

The arrangement operates in corresponding manner if the parameter of the measured value signal and of the test signal representing the capacitance is not the recurrence frequency of the pulses but another parameter, for example the pulse width in pulse width modulation or also the coding in a pulse code modulation.

Of particular significance is the fact that the correction arrangement described automatically compensates all influences which affect the test frequency and the measuring frequency in equal manner irrespective of the nature of said influences (temperature dependence, aging of components, etc.) and of the circuit component causing the change.

An important advantage further resides in that the correction of the ambient influences does not take place in the transducer disposed at the location of the probe but in the evaluation apparatus remote therefrom without the necessity of transmitting additional control signals via the two-wire line.

The solution described is also particularly suitable for the case in which the detector circuit 28 of the evaluation apparatus is formed by a correspondingly programmed microcomputer.

What is claimed is:

1. An arrangement for determining the level of material in a container, comprising:

a capacitive probe disposed in said container and defining a probe capacitance between said probe and said container dependent upon the material level in the container;

transducer means including a capacitance responsive circuit, disposed in the vicinity of said container, for producing a signal dependent on the capacitance existing at the input of said capacitance responsive circuit;

evaluation means disposed remote from said container;

a two-wire line connecting said evaluation means with said transducer means, said line comprising a means for transmitting a current supply DC voltage for operating said transducer means from said evaluation means to said transducer means, and for transmitting said signal from said transducer means to said evaluation means;

switching means, disposed in said transducer means, for switching, upon actuation, the input of said capacitance responsive circuit from said probe capacitance to said test capacitance;

time-controlled means, provided in said evaluation means, for changing the current supply DC voltage on said two-wire line periodically in a pulse-like manner;

a control circuit, disposed in said transducer means, responsive to said pulse-like changes of the current supply DC voltage, for actuation of said switching means;

whereby in each period of said pulse-like changes in current supply DC voltage said signal produced by said transducer means is a measured value signal which corresponds to said probe capacitance during a measuring time interval when said switching means is not actuated, and a test signal which corresponds to said test capacitance upon actuation of said switching means during a test time interval.

2. An arrangement as claimed in claim 1 wherein said capacitance responsive circuit is an oscillator whose frequency depends on capacitance at the input of the capacitance responsive circuit.

3. An arrangement as claimed in claim 1 wherein each pulse-like change of the current supply DC voltage comprises a brief interruption in the circuit supply DC voltage.

4. An arrangement as claimed in claim 1 wherein the transducer includes an energy store means for bridging the periodic pulse-like changes of the current supply DC voltage.

5. An arrangement as claimed in claim 1, wherein said pulse-like changes in said current supply DC voltage have a duration and an interruption, said duration and said interruption comprising said period, and said capacitive probe comprises:

a probe electrode connected in series with said switching means in a current circuit; and a detector circuit means, responsive to said pulse-like changes in said current supply DC voltage, for transmitting information to said evaluation means indicating the absence of said pulse-like changes in said current supply DC voltage.

6. An arrangement as claimed in claim 5, wherein said detector circuit means has an output and includes means, responsive to the absence of said pulse-like changes, for modifying the periodic actuation of said switching means.

7. The arrangement as claimed in claim 6, wherein said modifying means includes:

a voltage divider connected in series with said probe electrode; and a threshold value comparator having a first input connected to a tap of said voltage divider, and a second input connected to a fixed DC voltage.

8. An arrangement as claimed in claim 5, wherein said control circuit includes: a monostable flip-flop with a trigger input having a hold time which is smaller than said period of said pulse-like changes and greater than said duration of said pulse-like changes of the current supply DC voltage, the trigger input of said monstable flip-flop being connected to said output of said detector circuit means so that the monostable flip-flop is triggered upon each detection of one of said periodic current interruptions, and means connecting the output of said monostable flip-flop to said switching means for keeping said switching means in actuation during the hold time of said monostable flip-flop.

9. An arrangement as claimed in claim 1, wherein said transducer means includes two current supply terminals and said container comprises a conductive container wall, one wire of said two-wire line is connected to a first point of said container wall, one of said current supply terminals of said transducer means is connected to a second point of the container wall spaced from said first point, and the other of said current supply terminals of said transducer means is connected to the other wire of the two-wire line.

10. An arrangement as claimed in claim 1, wherein said evaluation means comprises: correction means, responsive to said test signal transmitted during each test time interval, for the correction of the measured value signal transmitted during each measuring time interval.

11. An arrangement as claimed in claim 10, wherein said evaluation means further comprises memory means for storing a value of the test signal transmitted during each test time interval.

12. An arrangement as claimed in claim 11, wherein said correction means, in a subsequent measuring time interval, is responsive to the value of the test signal stored in the memory, said test signal comprising a reference quantity in the evaluation of said measured value signal.

13. An arrangement as claimed in claim 10, wherein said evaluation means comprises a comparator circuit means, responsive at a first input to the value of the test signal and at a second input to a fixed initial value, for furnishing an output signal representing the difference between the input values as a correction quantity for the evaluation of the measured value signal.

* * * * *